United States Patent [19]
Münzner et al.

[11] 3,962,129
[45] June 8, 1976

[54] IMPREGNATION OF COKE WITH AN ORGANIC COMPOUND TO PRODUCE A MOLECULAR SIEVE

[75] Inventors: Heinrich Münzner, Essen; Heinrich Heimbach, Bochum; Werner Korbacher, Essen; Werner Peters, Wattenscheid; Harald Juntgen, Essen; Karl Knoblauch, Essen; Dieter Zundorf, Essen; Hugo Horbel, Essen, all of Germany

[73] Assignee: Bergwerksverband GmbH, Essen, Germany

[22] Filed: Feb. 4, 1974

[21] Appl. No.: 439,654

[30] Foreign Application Priority Data
Feb. 3, 1973   Germany............................ 2305435

[52] U.S. Cl.................................... 252/428; 55/74; 55/75; 252/444; 252/421; 423/460; 423/219; 423/579
[51] Int. Cl.$^2$..................... B01J 31/02; B01J 21/18; B01J 29/02
[58] Field of Search ........... 252/428, 444, 445, 421; 423/449, 460, 219, 579; 55/74, 75

[56] References Cited
UNITED STATES PATENTS

| | | | |
|---|---|---|---|
| 2,761,822 | 9/1956 | Addison | 252/421 |
| 3,442,819 | 5/1969 | Herbert | 252/428 |
| 3,459,652 | 8/1969 | Grangaard | 252/428 |
| 3,801,513 | 4/1974 | Munzner | 252/445 |
| 3,813,347 | 5/1974 | Hayes | 252/444 |

FOREIGN PATENTS OR APPLICATIONS

| | | | |
|---|---|---|---|
| 72,088 | 4/1970 | Germany | 423/460 |

*Primary Examiner*—Patrick P. Garvin
*Assistant Examiner*—P. E. Konopka
*Attorney, Agent, or Firm*—Michael J. Striker

[57] ABSTRACT

Porous coke is impregnated with an organic compound which remains in the pores thereby causing a reduction in the effective size of the same. This results in molecular sieve coke capable of separating different gases, particularly oxygen and nitrogen, and capable of adsorbing smaller gas molecules more rapidly than larger gas molecules. The organic compound has a boiling point of at least 200°C as measured at atmospheric pressure and of no more than 450°C as measured in vacuum.

8 Claims, No Drawings

IMPREGNATION OF COKE WITH AN ORGANIC COMPOUND TO PRODUCE A MOLECULAR SIEVE

BACKGROUND OF THE INVENTION

The invention relates generally to molecular sieves or filters. More particularly, the invention relates to carbon-containing molecular sieves and to a process of making the same.

It is known that coke having a certain volume of pores is suitable for adsorbing oxygen ($O_2$) molecules preferentially to nitrogen ($N_2$) molecules, that is, such coke is able to effect a certain separation of oxygen and nitrogen. The effective size or cross-section of the pores for effecting such a separation lies in the approximate range of 0.2 to 0.6 millimicrons. On the other hand, the pores in conventional coke have substantially larger cross-sections than this.

A manner of preparing molecular sieve coke which enables a gas mixture such as, for example, air, to be separated into a gas containing smaller gas molecules, for instance, oxygen, and a gas containing larger gas molecules, for instance, nitrogen, is also already known. Here, coke is heated to approximately 500 to 900°C and a stream of carbonaceous gas is passed through the coke. Carbon splits off from the gas and is deposited in the effective pores of the coke thereby reducing the cross-sections of these pores to the order of 0.3 millimicrons.

While the process outlined above does cause a reduction in the size of the pores, there are certain problems associated therewith. Thus, this process requires painstaking temperature regulation. Moreover, the product resulting from the treatment with the carbonaceous gas must be cooled in an inert gas stream. Hence, the aforementioned process is not only troublesome but is also relatively expensive.

SUMMARY OF THE INVENTION

It is, accordingly, a general object of the invention to provide a novel molecular sieve and a novel process of making molecular sieves.

More particularly, it is an object of the invention to provide a novel carbon-containing molecular sieve and a novel process of making the same.

Another object of the invention is to provide a process of making a carbon-containing molecular sieve which is simple and economical to perform.

A further object of the invention is to provide a carbon-containing molecular sieve which is of lower cost than those known from the art.

An additional object of the invention is to provide a carbon-containing molecular sieve which possesses a very long life.

In accordance with the foregoing objects, and others which will become readily apparent hereinafter, the invention sets forth a process for the production of a carbon-containing molecular sieve capable of separating different gases, particularly oxygen and nitrogen, and capable of adsorbing smaller gas molecules more rapidly than, or preferentially to, larger gas molecules. In brief, the novel process comprises providing coke having pores of a first size and effecting deposition of an organic substance in the pores so as to cause a reduction in the aforementioned first size of the pores to an effective second size. The novel carbon-containing molecular sieve includes coke having pores of a first size and an organic substance at least partially bounding these pores thereby effecting a reduction of the first size thereof to an effective second size. The effective size or diameter of the pores in which the organic substance is deposited advantageously lies between 0.2 and 0.6 millimicrons.

DESCRIPTION OF THE PREFERRED EMBODIMENTS

It has now been found that suitable molecular sieve coke for separating gases, particularly oxygen and nitrogen, and which adsorbs smaller gas molecules more rapidly than larger gas molecules, may be obtained by impregnating coke with organic substances such as organic compounds which advantageously have a boiling point between 200° and 450°C in the pressure range from atmospheric pressure to vacuum, i.e. substantially zero pressure. This impregnation has the result that the cross-sections of those pores in the porous coke which are too large are reduced to the requisite dimensions or diameter of approximately 0.2 to 0.6 millimicrons. Surprisingly, the resulting openings or free cross-sections in the pore system of the coke remain effective over a practically unlimited period of time without, however, requiring coking or carbonization of the substance which is responsible for the reduction in pore size as was necessary heretofore. Consequently, molecular sieve coke is produced wherein the openings or pores are partially or completely bounded by an organic substance having a boiling point of about 200° to 450°C in the pressure range from atmospheric pressure to vacuum, that is, wherein the pores are at least partially lined with such organic substances or compounds.

It is pointed out here that it may be necessary to dry the coke for an extended period of time after it has been impregnated with the organic substance, i.e. the impregnating agent. There exists, then, the danger that the impregnating agent will be vaporized during the drying operation. Thus, the impregnating agent should have a minimum boiling point of about 200°C as measured at atmospheric pressure. However, it is also possible to use higher boiling point organic substances or compounds such as, for example, solid hydrocarbons, as the impregnating agent in the process of the invention, which organic substances may be dissolved in a solvent. Consequently, the impregnating agent might have a boiling point as high as approximately 360° to 450°C as measured in vacuum. It will be understood herein that the phrase "having a boiling point between 200° and 450°C in the pressure range from atmospheric pressure to vacuum", and similar phrases, are interpreted in the above manner, namely, that the impregnating agent has a minimum boiling point of about 200°C at atmospheric pressure and a maximum boiling point of about 450°C in vacuum or at substantially zero pressure. This corresponds approximately to a boiling range of 200° to 550°C as measured at atmospheric pressure. It is also pointed out that, although the impregnating agent may have a boiling point between 200° and 450°C in the pressure range from atmospheric pressure to vacuum, a boiling point between 200° and 360°C in this pressure range has been found to be quite satisfactory.

All carbonaceous or carbon-containing materials which neither melt nor soften come into consideration as starting materials for the coke to be impregnated or contacted with the organic substance or compound. Thus, for example, oxidized bituminous coal, anthracite, brown coal or lignite, peat, coconut shells and wood may be used for this purpose. In addition, activated coke produced from the aforementioned starting materials may be transformed into molecular sieve coke using the impregnation according to the invention.

Carbonaceous or carbon-containing materials which are particularly suitable for effecting a reduction in the pore size include hydrocarbon-containing compounds and all of the aromatic or aliphatic hydrocarbons, as well as substituted hydrocarbons, which can be distilled in the temperature range of 200° to 450°C under atmospheric pressure or under vacuum. For instance, the light or heavy fuel oil fractions and hard paraffins derived from crude oil or petroleum, either singly or in mixture with one another, are suitable for this purpose. Other substances which are suitable for this purpose include the fractions derived from coal tar, for example, anthracene oils, as well as, for instance, phenanthrene, anthracene, hexamethylbenzene, methylnaphthalene, diphenyl, dibenzyl, acenaphthene, 1,2,3,4-tetrahydronaphthalene, stilbene, diphenylmethane, triphenylmethane, maleic acid anhydride, paraffin oil, kerosene and lubricating oil. In addition, distillation residues such as, for example, soft pitch, may also suitably be used.

The impregnation of the coke may be achieved by permitting the impregnating substance or agent to flow through the coke at an elevated temperature where the impregnating substance exists in vaporous form or in gaseous form or in the form of an aerosol. The treating temperature should, correspondingly, lie approximately in the range of 250° to 450°C. In order to obtain a better distribution of the impregnating agent, this manner of treating the coke is advantageously performed using a stream of an inert gas such as, for instance, nitrogen, which contains the impregnating agent. A treatment time of about 10 to 60 minutes is usually sufficient to achieve the desired reduction in pore size.

In accordance with another embodiment of the invention, it is possible to perform the impregnation by soaking the coke with or immersing the coke in an impregnating substance which is dissolved in a solvent.* After the impregnation, the solvent is removed from or driven off from the coke. Solvents which are suitable for dissolving the impregnating substance include, for example, petroleum ether, ethylene chloride, methylene chloride, carbon tetrachloride, acetone, benzene and cyclohexane. In the treatment according to the invention, the solvent may be distilled from the coke under atmospheric pressure or under vacuum.

If the coke is inadequately impregnated with a single treatment, then the coke may be readily subjected to one or more additional treatments in accordance with the invention until the desired reduction in pore size has been achieved.

The coke to be impregnated may be in the form of particles having a particle size of, for instance, 2 to 10 millimeters. The coke may be brought to the desired particle size by pulverization. However, it is also possible to subject shaped coke bodies to the process of the invention instead of using coke which has been reduced to a desired particle size by pulverization. For instance, spherical, cylindrical, hollow cylindrical and egg-shaped coke bodies, as well as larger coke briquettes which are pulverized to the desired particle size, may be treated by the process of the invention. The coke to be treated may be produced in several ways, two illustrative examples of which are presented below:

1. Suitable coal, carbon, carbonaceous material and/or coke is briquetted using 15 to 40% of a binding agent such as pitch, bitumen, tar or tar oil. These briquettes are coked or carbonized at a temperature of 600° to 900°C. The briquetting may be carried out at normal or room temperature or may be carried out at elevated temperature using a hand press, an extruder or a roll press.

2. Coal, carbon or carbonaceous material, if necessary, in mixture with pitch, bitumen, tar or tar oil, is formed by pelletizing into the shape of spheres having the desired size. The pellets are then coked or carbonized.

As an example of one manner of accomplishing the impregnation according to the invention, cold coke, for instance, may be immersed in solutions of high boiling point hydrocarbons for a period of 10 to 60 minutes or even longer. Thereafter, the coke is removed and excess solution is permitted to drip off or drain or may be removed by centrifuging. Subsequently, residual solvent is advantageously distilled off by slightly heating the coke, for example, to a temperature of approximately 120°C, while applying a vacuum. After removal of the solvent, the thus-impregnated coke is advantageously dried at a temperature in excess of about 100°C for a period of approximately 1 to 3 hours or longer.

A quantity test may be performed for testing the quality of the carbon-containing molecular sieve coke produced according to the invention. Thus, a tube having a capacity of 1 liter is filled with the impregnated coke. Air is passed through the tube from bottom to top at atmospheric pressure and at a rate of 30 centimeters per second for a period of two minutes. Subsequently, the adsorbed gas is desorbed for a period of two minutes by means of a vacuum and then analyzed.

Molecular sieve coke produced in accordance with the invention and tested in this manner yielded gases having a composition of 35 volume % oxygen or more and 65 volume % nitrogen or less.

The following Examples illustrate the process according to the invention. However, it is to be understood that these Examples are merely illustrative in nature and are not intended to limit the invention in any manner.

EXAMPLE 1

Coking coal particles, all having a particle size of less than 0.08 millimeters, were treated in a fluidized bed with air at a temperature of 230°C until an oxygen content of 12% by weight was obtained. 77 parts by weight of the thus-treated coal was mixed with 23 parts by weight of soft pitch (Kramer-Sarnow softening point 52°–56°C) at approximately 70°C while adding water. The mixture was then shaped in an extruder to the form of cylindrical bodies having a diameter of 2 millimeters and degassed in a rotating tubular oven from which air was excluded until a 3% content of volatile components had been obtained. The temperature in the oven was increased at an average of 10°C per minute until a final temperature of 700°C had been reached. 150 parts by weight of the oxidized coke was then treated with a solution containing 0.83 parts by weight of fuel oil in 50 parts by weight of petroleum ether by immersion for a period of 15 minutes. Thereafter, the excess solution was permitted to drain, the petroleum ether removed at normal or room temperature under a vacuum of 15 torr and the resulting product dried for 1 hour at 100°C. The quality test yielded the following gas composition: 51 volume % oxygen and 49 volume % nitrogen.

EXAMPLE 2

Shaped coke derived from oxidized coking coal was produced in the manner described in Example 1 and degassed to obtain a content of volatile components of 3%. After cooling to a temperature of 260°C in a stream of nitrogen, 1 gram of diphenyl per Nm$^3$ was added to the nitrogen stream at 260°C and the treatment continued for 10 minutes while holding the temperature constant. The quality test yielded the following gas composition: 46 volume % oxygen and 54 volume % nitrogen.

EXAMPLE 3

Coking coal particles, all having a particle size of less than 0.08 millimeters, were treated in a fluidized bed with air at a temperature of 230°C until an oxygen content of 12% by weight was obtained. 83.75 parts by weight of the thus-treated coal was pelletized with 15 parts by weight of hard pitch (Kramer-Sarnow softening point 140°C) and 5% solid substances of waste sulfite liquor in 25 parts by weight of sprayed water. The resulting spherical, shaped bodies, having a diameter between 3 and 4 millimeters, were degassed in a rotating tubular oven from which air was excluded until a 3% content of volatile components was obtained. The temperature in the oven was increased at an average of 10°C per minute until a final temperature of 750°C was reached. After cooling, 150 parts by weight of the oxidized coke was heated together with a solution containing 2 parts by weight of heavy fuel oil in 80 parts by weight of methylene chloride for a period of 10 minutes using a reflux condenser. After cooling, the excess solution was filtered off, the remainder of the methylene chloride removed at normal or room temperature in a vacuum of 50 torr and the resulting product dried for 2 hours at 110°C. The quality test yielded the following gas composition: 41 volume % oxygen and 59 volume % nitrogen.

EXAMPLE 4

75 parts by weight of ground charcoal, all of the particles of which had a particle size of less than 0.1 millimeters, was mixed with 25 parts by weight of soft pitch (Kramer-Sarnow softening point 52° to 52°C) while adding water. The mixture was then shaped in an extruder to the form of cylindrical bodies having a diameter of 2 millimeters and degassed in a rotating tubular oven from which air was excluded until a 3% content of volatile components was obtained. The temperature in the oven was increased at an average of 10°C per minute until a final temperature of 700°C had been reached. After cooling, 150 parts by weight of the shaped charcoal coke was cooked or boiled together with a solution containing 1.6 parts by weight of hard paraffin in 50 parts by weight of cyclohexane for a period of 30 minutes using a reflux condenser. After cooling, the excess solution was filtered off and the residual solvent removed by suction in a vacuum of 10 torr. The resulting product was subsequently heated for 1 hour at 110°C. The quality test yielded the following gas composition: 46 volume % oxygen and 54 volume % nitrogen.

EXAMPLE 5

Anthracite coal having a particle size between 2 and 4 millimeters was degassed in a rotating tubular oven from which air was excluded until approximately a 1% content of volatile components had been obtained. The temperature in the oven was increased at an average of 10°C per minute until a final temperature of 700°C had been reached. After cooling, 150 parts by weight of the anthracite low-temperature coke was treated with a solution containing 0.6 parts by weight of anthracene oil in 60 parts by weight of benzene by immersion for a period of 40 minutes. Thereafter, the excess solution was filtered off and the resulting product dried for 1 hour at 130°C. The quality test yielded the following gas composition: 35 volume % oxygen and 65 volume % nitrogen.

EXAMPLE 6

Coconut shells were degassed in a rotating tubular oven from which air was excluded until approximately a 1% content of volatile components had been obtained. The temperature in the oven was increased at an average of 10°C per minute until a final temperature of 700°C had been reached. After cooling, the coconut shell coke was pulverized to a particle size of 2 to 4 millimeters and 150 parts by weight thereof treated with a solution containing 0.3 parts by weight of phenanthrene in 50 parts by weight of acetone by immersion for a period of 15 minutes. Thereafter, the excess solution was filtered off and the resulting product dried for 1 hour at 150°C. The quality test yielded the following gas composition: 39 volume % oxygen and 61 volume % nitrogen.

EXAMPLE 7

Coking coal particles, all having a particle size of less than 0.08 millimeters, were treated in a fluidized bed with air at a temperature of 230°C until an oxygen content of 12% by weight was obtained. 77 parts by weight of the thus-treated coal was mixed with 23 parts by weight of soft pitch (Kramer-Sarnow softening point 52° to 56°C) at 70°C while adding water. The mixture was then shaped in an extruder to the form of cylindrical bodies having a diameter of 3 millimeters and degassed in a rotating tubular oven from which air was excluded until approximatetely a 1% content of volatile components had been obtained. The temperature in the oven was increased at an average of 10°C per minute until a final temperature of 800°C had been reached. Thereafter, an activation was performed in known manner through the introduction of water vapor. After cooling, 150 parts by weight of the activated coke was treated together with a solution containing 2 parts by weight of paraffin oil in 80 parts by weight of ethylene chloride by cooking or boiling with a reflux condenser for a period of 15 minutes. After cooling, the excess solution was filtered off, the residual solvent distilled off at normal or room temperature in a vacuum of 25 torr and the resulting product heated for 2 hours at 120°C. The quality test yielded the following gas composition: 52 volume % oxygen and 48 volume % nitrogen.

EXAMPLE 8

150 parts by weight of peak coke having a particle size of 1 to 3 millimeters was cooked or boiled for a period of 15 minutes together with an aqueous solution of waste beechwood sulfite liquor (5% by weight of dried substances) using a reflux condenser. The excess solution was then filtered off and the resulting product dried and subsequently heated at 400°C for a period of 30 minutes under nitrogen. Thereafter, the product was cooked or boiled for a period of 15 minutes together with a solution containing 1 part by weight of soft pitch, 1 part by weight of lubricating oil and 80 parts by weight of benzene using a reflux condenser. The solution was next filtered off and the product dried for 1 hour at 110°C. the quality test yielded the following gas composition: 35 volume % oxygen and 65 volume % nitrogen.

EXAMPLE 9

Shaped coke derived from oxidized coking coal was produced in the manner described in Example 1 and degassed to obtain a content of volatile components of 3%. After cooling, 150 parts by weight of the oxidized coke was treated with a solution containing 2.1 parts by weight of maleic acid anhydride in 80 parts by weight of acetone by immersion for a period of 20 minutes. Thereafter, the excess solution was filtered off and the resulting product dried for 1 hour at 110°C. The quality test yielded the following gas composition: 35 volume % oxygen and 65 volume % nitrogen.

It will be appreciated that the invention has obviated the need for coking or carbonizing the agent responsible for the reduction in pore size as has been necessary heretofore.* On page 9, line 22, as indicated: An impregnating temperature from 10° C to the boiling point of the solvent is convenient. The impregnation may be achieved with solutions having 0.2 – 50 % by weight of the impregnating substance by contact for a period of 10 – 60 minutes.

It will be understood that each of the elements described above, or two or more together, may also find a useful application in other types of processes and uses differing from the types described above.

While the invention has been illustrated and described as embodied in a molecular sieve and process for making the same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A process for the production of a carbon-containing molecular sieve capable of separating different gases, particularly oxygen and nitrogen, and capable of adsorbing smaller gas molecules more rapdily than larger gas molecules, said process consisting of impregnating coke, having pores of a first size with a solution which includes an organic substance and a solvent for said organic substance which volatilizes more readily than said organic substance, said organic substance having a boiling point of at least about 200°C at atmospheric pressure and at most about 450°C at substantially zero pressure being a member of the group consisting of the light and heavy fuel oil fractions and hard paraffins derived from crude oil and petroleum, the fractions derived from coal tar, phenanthrene, anthracene, hexamethylbenzene, methylnaphthalene, diphenyl, dibenzl, acenaphthene, 1,2,3,4-tetrahydronaphthalene, stilbene, diphenylmethane, triphenylmethane, maleic acid anhydride, paraffin oil, kerosene, lubricating oil and pitch distillation residues; and permitting said solvent to undergo evaporation under conditions such that said organic substance remains in said pores thereby causing a reduction of said first size to an effective second size between about 0.2 and about 0.6 millimicrons, said organic substance being left in a non-coked condition.

2. A process as defined in claim 1, wherein said organic substance has a boiling point of substantially 360°C at most as measured at substantially zero pressure.

3. A process as defined in claim 1, wherein the impregnating step is carried out at a temperature in excess of room temperature.

4. A process as defined in claim 1, wherein said coke is particulate.

5. A process as defined in claim 4, wherein the coke particles have a size between substantially 2 and 10 millimeters.

6. A process as defined in claim 1, wherein the impregnating step is carried out for a period of substantially 10 to 60 minutes.

7. A process as defined in claim 1, wherein said organic substance is a member of the group consisting of fuel oil, diphenyl, paraffin, anthracene oil, phenanthrene, paraffin oil, pitch, lubricating oil and maleic acid anhydride.

8. A process as defined in claim 1, wherein said solvent comprises at least one member of the group consisting of petroleum ether, ethylene chloride, methylene chloride, carbon tetrachloride, acetone, benzene and cyclohexane.

* * * * *